United States Patent
Pensmith

[11] Patent Number: 6,081,392
[45] Date of Patent: Jun. 27, 2000

[54] MEDICINE CONTAINER MAGNIFIER

[76] Inventor: Mildred A. Pensmith, 23872 Arlene Ave., Elkhart, Ind. 46517

[21] Appl. No.: 09/154,368

[22] Filed: Sep. 16, 1998

Related U.S. Application Data

[63] Continuation-in-part of application No. 09/150,981, Sep. 11, 1998, abandoned.
[60] Provisional application No. 60/058,886, Sep. 15, 1997.

[51] Int. Cl.[7] .................................................. G02B 27/02
[52] U.S. Cl. ............................ 359/802; 359/804; 359/440
[58] Field of Search .................................. 359/801, 802, 359/808, 809, 810, 803, 442, 804, 805, 440; D16/135, 134, 136

[56] References Cited

U.S. PATENT DOCUMENTS

| | | | |
|---|---|---|---|
| D. 243,329 | 2/1977 | Snarski | D16/54 |
| D. 333,146 | 2/1993 | McDevitt | D16/135 |
| 1,762,809 | 6/1930 | Bradford | |
| 1,971,519 | 8/1934 | Bradford | 248/288.31 |
| 2,270,005 | 1/1942 | Jansey | |
| 2,718,815 | 9/1955 | Manning | 359/442 |
| 2,746,346 | 5/1956 | Gaire | 359/442 |
| 2,905,054 | 9/1959 | Logan | 359/819 |
| 3,955,884 | 5/1976 | Del Pesco, Sr. | 359/804 |
| 4,259,784 | 4/1981 | MacPherson | 33/1 K |
| 4,324,050 | 4/1982 | Weir | 33/488 |
| 4,331,381 | 5/1982 | Hunter | 139/431 |
| 4,379,618 | 4/1983 | Tall | 359/804 |
| 4,457,585 | 7/1984 | DuCorday | |
| 4,991,935 | 2/1991 | Sakurai | 359/804 |
| 5,130,853 | 7/1992 | Sakurai | 359/803 |
| 5,245,477 | 9/1993 | Nyman | 359/818 |
| 5,307,209 | 4/1994 | Iaquinto et al. | 359/811 |
| 5,309,279 | 5/1994 | Halstead | 359/442 |
| 5,471,347 | 11/1995 | Galiani | 359/807 |
| 5,572,371 | 11/1996 | Woolf | 359/802 |

*Primary Examiner*—Georgia Epps
*Assistant Examiner*—Suzanne Letendre
*Attorney, Agent, or Firm*—Barnes & Thornburg

[57] ABSTRACT

A magnification device for removable attachment to an object to magnify the surface of the object for improved viewing includes a magnification member of substantially uniform thickness and an attachment part including a front part connected to the magnification member and a pair of spaced apart arms extending from the front part, each of the arms including a clamping portion for compressively engaging the outer surface of the object. Once the magnification device is clamped onto the object, any indicia or labeling on the surface of the object, when viewed through the magnification member, appears enlarged and easier to read.

34 Claims, 3 Drawing Sheets

MEDICINE CONTAINER MAGNIFIER

This application is a continuation-in-part of application Ser. No. 09/150,981, now abandoned filed on Sep. 11, 1998 which claimed the benefit of U.S. Provisional Application Ser. No. 60/058,886, filed Sep. 15, 1997.

FIELD OF THE INVENTION

This invention relates to a magnification device and more particularly to a magnifier for removable attachment to an object to magnify the surface of the object.

BACKGROUND OF THE INVENTION

The text of labeling on small containers, for example medicine bottles, is often relatively small and difficult to read. As a result of this difficulty, some people, particularly people with sight problems such as the elderly, misidentify the contents of such containers. If the container holds medicine, such a misidentification can obviously lead to illness or death.

SUMMARY OF THE INVENTION

The present invention provides a magnification device for removable attachment to an object, such as a pill bottle, to magnify the surface indicia or label on the object. The device includes a magnification member of substantially uniform thickness which is held a distance away from the surface of the object by an attachment part such that when viewed through the magnification member, the surface indicia or labeling on the object appears enlarged. The attachment part includes a front part which supports or holds the magnification member in substantially parallel relationship to the surface of the object. A pair of spaced apart arms extend from the front part. Each of the arms include a clamping portion for engaging the object. The distance between the clamping portions is smaller than the outer dimension of the object so that after the resilient arms are flexed apart and released, thereby clamping the attachment part to the object, the resiliency of the arms maintains the attachment part in clamping engagement with the object.

The objects and advantages of the present invention will become apparent and the invention better understood with reference to the following description and the accompanying drawings.

DESCRIPTION OF EMBODIMENTS OF THE INVENTION

The embodiments described herein are not intended to be exhaustive or to limit the invention to the precise forms disclosed. Rather, the embodiments selected for description are described to permit those skilled in the art to utilize their teachings.

Figure 1:
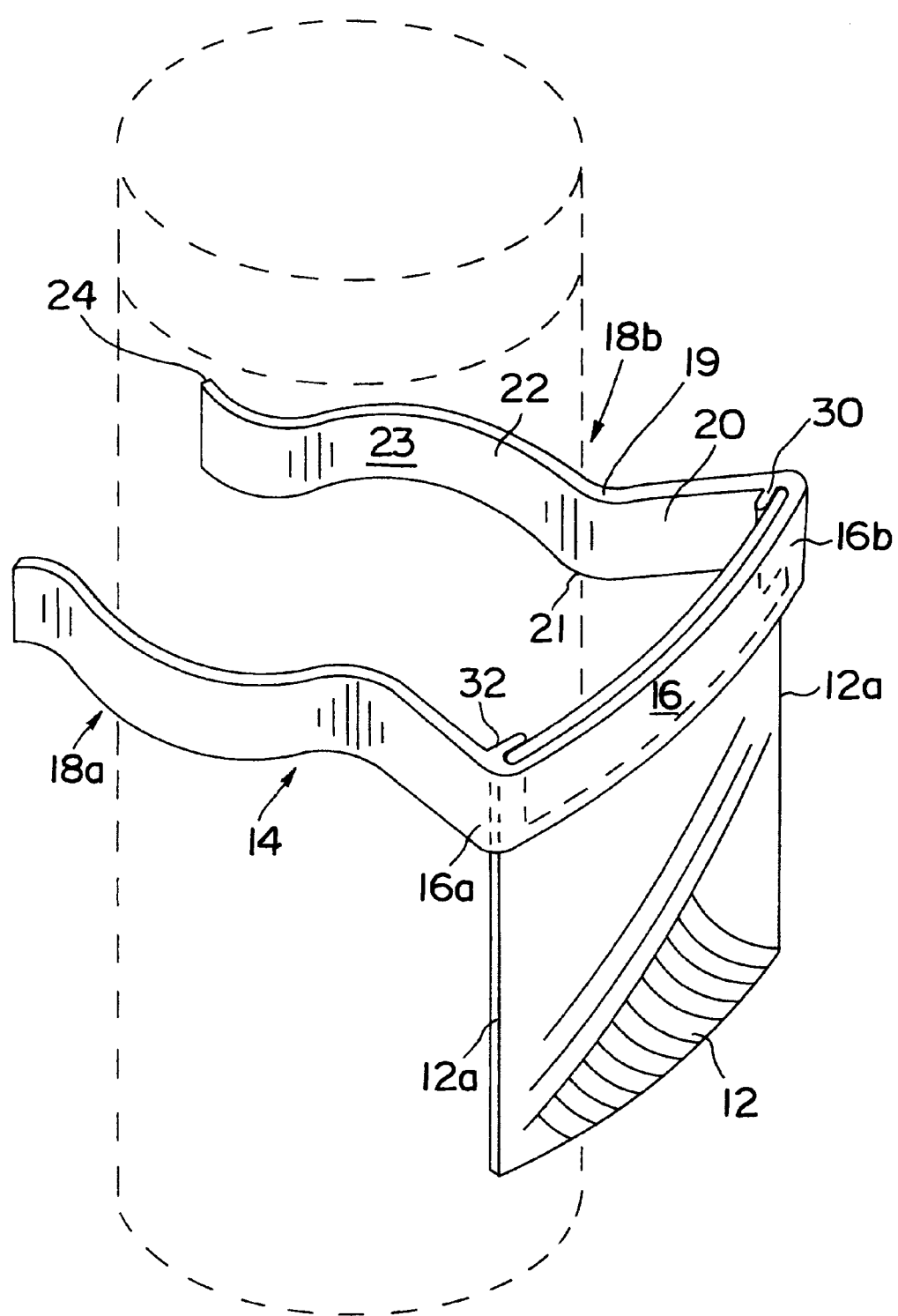
FIG. 1 is a perspective view of a magnification device according to the present invention.

FIG. 1 shows one embodiment of the magnification device according to the present invention mounted to a cylindrical pill or medicine container (shown in dotted lines). The magnification device 10 generally includes a magnification member 12 and an attachment part 14. Magnification member 12 is of substantially uniform thickness and of a generally rectangular shape. Magnification member 12 is fabricated from a magnification material such as glass or plastic. In the embodiment shown, magnification member 12 is curved or held by attachment part to form a curve between the side edges 12a of the member. Magnification member 12 may be formed into this curved shape or be flexible and thereby capable of conforming to this curved shape. Of course, magnification member 12 could also be flat, without a curved surface.

Attachment part 14, shown in FIG. 1, includes a front part 16 and a pair of arms generally designated 18a, 18b. Like magnification member 12, front part 16 of attachment part 14 is slightly curved or bowed to approximate the contour of the outer surface of the medicine container. Arms 18 are integrally formed with front part 16. One arm 18a extends from one end 16a and the other arm 18b extends from the other end 16b. Adjacent end 16a, extending from arm 18a, is support part 32. Similarly, extending from arm 18b adjacent end 16b of front part 16 is support part 30. Each support part 30, 32 forms a ridge which extends from the top edge 19 of the arm to the bottom edge 21 of the arm. Each support part 30, 32 extends away from its respective arm in substantially parallel relationship to front part 16. As shown in the figure, magnification member 12 is held between the support parts 30, 32 and the front part 16.

Arms 18a, 18b each include a first portion 20. The first portions 20 converge toward one another with distance from front part 16. The dimension of first parts 20 determines the spacing between magnification member 12 and the outer surface of the object. Each arm 18a, 18b also includes a curved, clamping portion 22. Each clamping portion 22 is curved to approximate the outer contour of a particular sized medicine container. The distance or gap between the inner surfaces 23 of clamping portions 22 is slightly smaller than the outer dimension of the medicine container to which the magnification device is attached.

Arms 18a, 18b also include an end portion 24. End portions 24 curve away from one another or otherwise diverge with distance from clamping portions 22.

Magnification device 10 according to the present invention is attached to the medicine container or other object by spreading the attachment part arms 18a, 18b, which are formed of an appropriately resilient material, outwardly away from one another, positioning the medicine container or other object between clamping portions 22, and then releasing arms 18a, 18b so that clamping portions 22 move into engagement with the outer surface of the object, thereby clamping magnification device 10 to the object. Alternatively, magnification device 10 may simply be snapped onto the medicine container or other object by moving the device laterally toward the container so that end portions 24 contact the outer surface of the object, then function as caming surfaces to spread arms 18a, 18b away from one another as attachment part 14 is forced further laterally toward the object. When the object is positioned between curved clamping portions 22, arms 18a, 18b move toward one another and into compressive engagement with the outer surface of the object. As should be apparent from the foregoing, the arms 18a, 18b may be shaped to provide various spacings between inner surfaces 23 of clamping portions 22 so that magnification device 10 fits snugly onto containers of various sizes under its own biasing force due to the resiliency of the arms.

Figure 2:
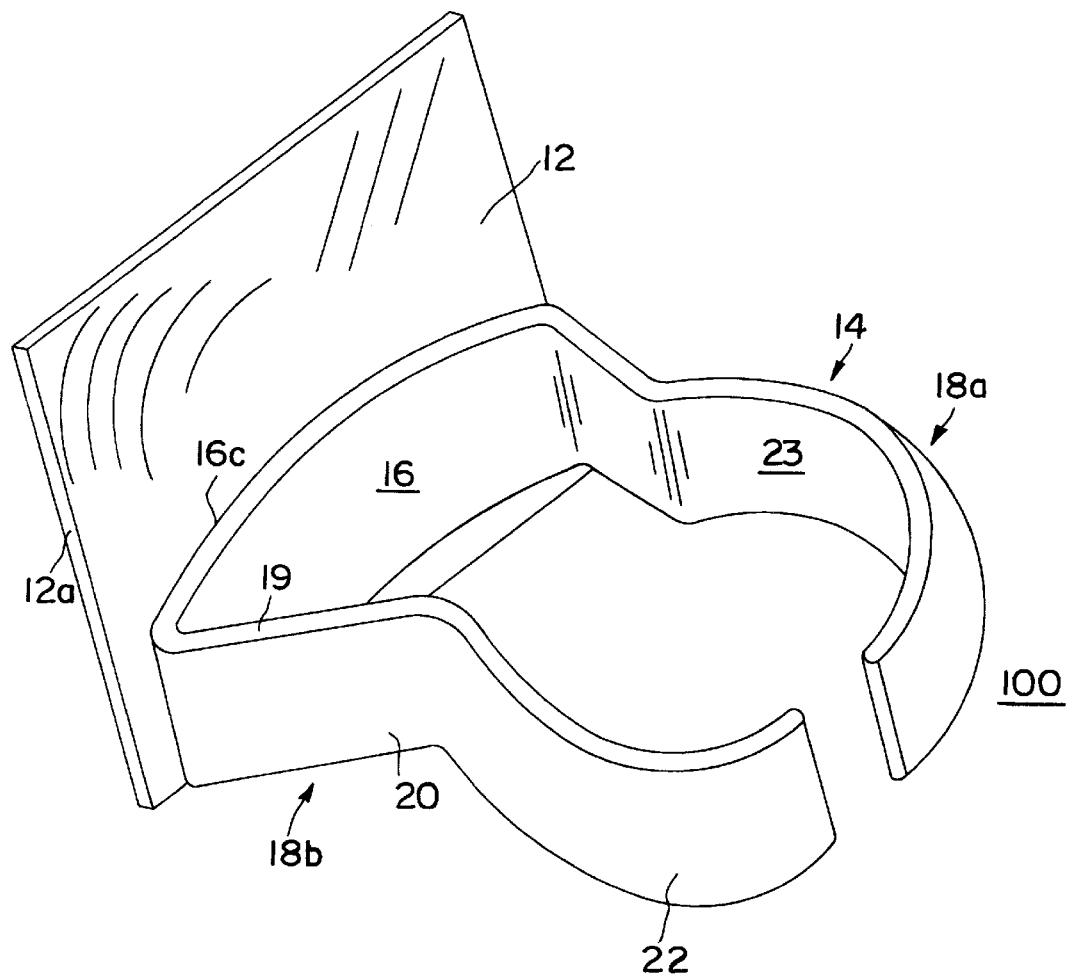
FIG. 2 is a perspective view of another embodiment of a magnification device according to the present invention.
Figure 3:
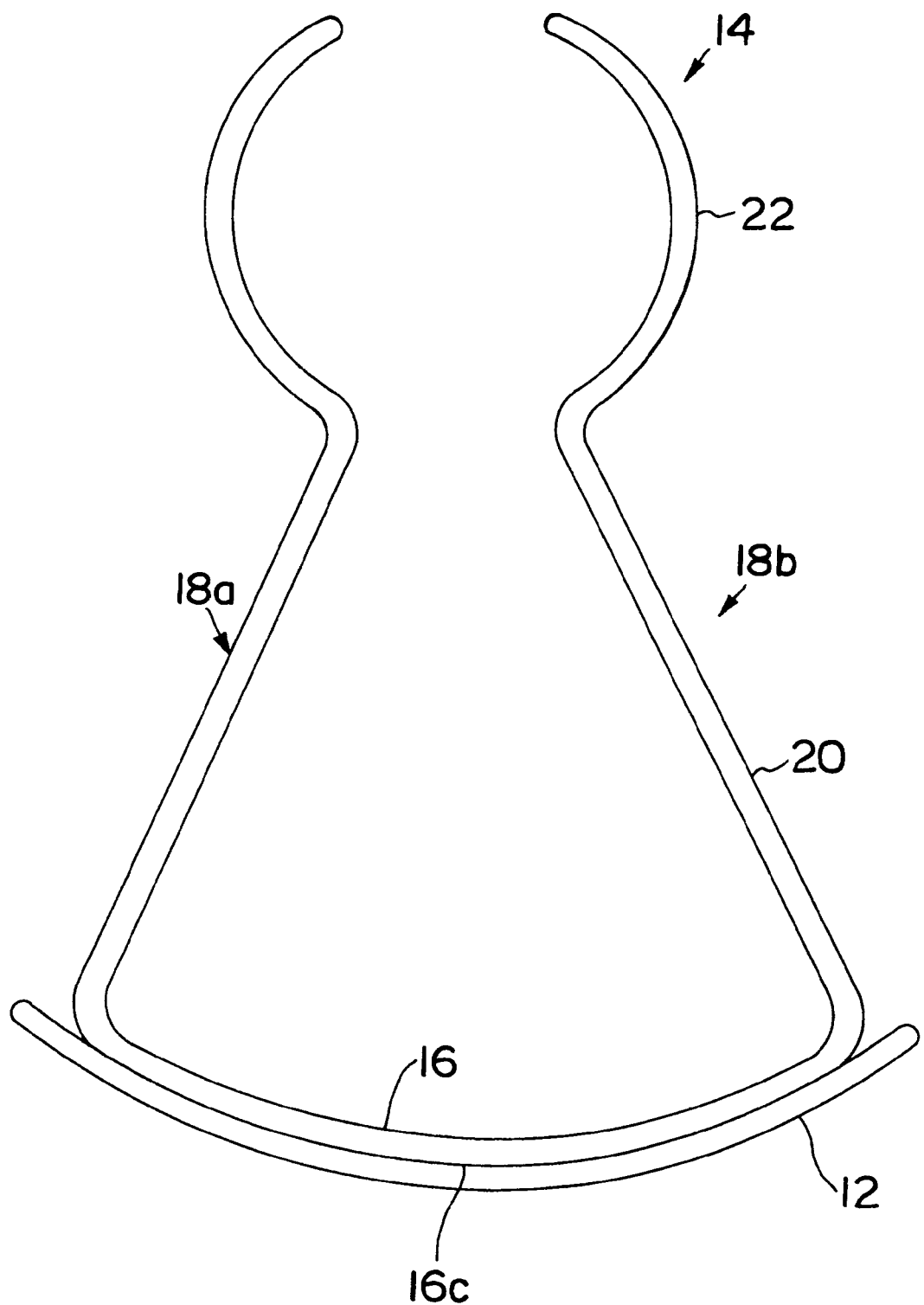
FIG. 3 is a top plan view of the magnification device shown in FIG. 2.

FIGS. 2 and 3 show an alternative embodiment of the magnification device according to the present invention. In this embodiment, magnification member 12 is affixed or otherwise attached to the front surface 16c of front part 16. Accordingly, attachment arms 18a, 18b do not include support parts 30, 32. Additionally, first portions 20 and curved portions 22 of arms 18a, 18b have dimensions and proportions which are different from the corresponding parts of arms 18a, 18b shown in FIG. 1. The embodiment of FIGS. 2 and 3 also does not include end portions 24 of attachment arms 18a, 18b.

In operation, arms 18a, 18b of magnification device 100 are simply flexed away from one another a sufficient distance to allow for the insertion of a medicine container. Arms 18a, 18b are released and the resiliency of the arms exert an inward bias so as to clamp the device 10 onto the medicine container. Of course, arms 18a, 18b may be spread apart a lesser distance and slid or guided over the top or bottom end of the medicine container. In any event, magnification device 100 is clamped onto the container such that the surface indicia or label on the container, when viewed through magnification member 12, appears enlarged and easier to read.

While this invention has been described as having exemplary embodiments, this application is intended to cover any variations, uses, or adaptations of the invention using its general principles. Further, this application is intended to cover such departures from the present disclosure as come within the known or customary practice within the art to which it pertains. The spirit and scope of the invention are to be limited only by the terms of the appended claims.

What is claimed is:

1. A magnifier for removable attachment to an object to magnify the surface the object, the magnifier comprising:
    a magnification member of substantially uniform thickness;
    an attachment part including a front part connected to the magnification member and a pair of spaced apart arms extending from the front part, each of the arms including a clamping portion for engaging the object;
    wherein the front part includes a first end connected to one of the arms and a second end connected to the other arm; and
    wherein the front part is curved between the first end and the second end.

2. The magnifier of claim 1 wherein the magnification member is curved.

3. The magnifier of claim 1 wherein the arms are resilient.

4. The magnifier of claim 3 wherein the arms are flexed away from one another during attachment to the object, the resiliency of the arms maintaining the clamping portions in engagement with the object.

5. The magnifier of claim 1 wherein each of the arms includes a first portion extending between the front part and the clamping portion thereby spacing the magnification member from the object.

6. The magnifier of claim 5 wherein the first portion of one arm is connected to one end of the front part and the first portion of the other arm is connected to another end of the front part, the first portions converging toward one another with distance from the front part.

7. The magnifier of claim 1 wherein each of the arms includes an end portion which extends away from the other arm.

8. The magnifier of claim 7 wherein the end portions are curved.

9. The magnifier of claim 1 wherein the clamping portions are curved to engage a curved object.

10. The magnifier of claim 1 wherein the attachment part further includes a support part, the magnification member being held between the front part and the support part.

11. The magnifier of claim 1 wherein each of the arms includes an inner surface facing the other arm, the attachment part further including a first support part connected to the inner surface of one of the arms and a second support part connected to the inner surface of the other arm, the first and the second support parts extending substantially toward one another in substantially parallel relationship to the front part.

12. The magnifier of claim 1 wherein the magnification member is connected to a front surface of the front part.

13. A magnifier for removable attachment to an object comprising:
    a magnification member;
    an attachment part for supporting the magnification member a distance away from the object, the attachment part including a front part connected to the magnification member, a first arm connected to the front part adjacent one end of the front part, and a second arm connected to the front part adjacent another end of the front part, the first arm including a clamping portion for engaging the object, the second arm including a clamping portion for engaging the object, the first arm clamping portion opposing the second arm clamping portion; and
    wherein the arms are resilient.

14. The magnifier of claim 13 wherein the magnification member is of substantially uniform thickness.

15. The magnifier of claim 13 wherein the magnification member has a top edge, a bottom edge, and a pair of side edges.

16. The magnifier of claim 15 wherein the magnification member is curved between the side edges.

17. The magnifier of claim 13 wherein the front part is curved between the one end of the front part and the other end of the front part.

18. The magnifier of claim 13 wherein the arms are flexed away from one another during attachment to the object, the resiliency of the arms maintaining the clamping portions in engagement with the object.

19. The magnifier of claim 13 wherein each of the arms includes an end portion which extends away from the other arm.

20. The magnifier of claim 19 wherein the end portions are curved.

21. The magnifier of claim 13 wherein the clamping portions are curved to engage a curved object.

22. The magnifier of claim 13 wherein the attachment part further includes a support part, the magnification member being held between the front part and the support part.

23. The magnifier of claim 13 wherein each of the arms includes an inner surface facing the other arm, the attachment part further including a first support part connected to the inner surface of one of the arms and a second support part connected to the inner surface of the other arm, the first and the second support parts extending substantially toward one another in substantially parallel relationship to the front part.

24. The magnifier of claim 13 wherein the magnification member is connected to a front surface of the front part.

25. A magnifier for removable attachment to an object comprising:
    a magnification member for magnifying the surface of the object; and
    a pair of resilient arms attached to the magnification member for clamping onto the object, the arms being spaced apart from one another to form a gap having a smaller dimension than the outside dimension of the object so that the arms are biased inwardly toward one another into clamping engagement with the object when the magnifier is attached to the object.

26. A magnifier for removable attachment to an object comprising:

a curved magnification means having curved upper and under surfaces for magnifying the surface of the object; and attachment means for attachment to the object including arm means for clamping onto the object, and means for supporting the curved magnification means away from the object in substantially parallel relationship to a surface of the object.

27. A magnifier for removable attachment to an object to magnify the surface of the object, the magnifier comprising:

a magnification member of substantially uniform thickness;

an attachment part including a front part connected to the magnification member and a pair of spaced apart arms extending from the front part, each of the arms including a clamping portion for engaging the object, wherein each of the arms includes a first portion extending between the front part and the clamping portion thereby spacing the magnification member from the object; and wherein the first portion of one arm is connected to one end of the front part and the first portion of the other arm is connected to another end of the front part, the first portions converging toward one another with distance from the front part.

28. A magnifier for removable attachment to an object to magnify the surface of the object, the magnifier comprising:

a magnification member of substantially uniform thickness;

an attachment part including a front part connected to the magnification member and a pair of spaced apart arms extending from the front part, each of the arms including a clamping portion for engaging the object; and wherein each of the arms includes an end portion which extends away from the other arm.

29. A magnifier for removable attachment to an object to magnify the surface of the object, the magnifier comprising:

a magnification member of substantially uniform thickness;

an attachment part including a front part connected to the magnification member and a pair of spaced apart arms extending from the front part, each of the arms including a clamping portion for engaging the object; and wherein the clamping portions are curved to engage a curved object.

30. A magnifier for removable attachment to an object to magnify the surface of the object, the magnifier comprising:

a magnification member of substantially uniform thickness;

an attachment part including a front part connected to the magnification member and a pair of spaced apart arms extending from the front part, each of the arms including a clamping portion for engaging the object; and wherein the attachment part further includes a support part, the magnification member being held between the front part and the support part.

31. A magnifier for removable attachment to an object comprising:

a magnification member;

an attachment part for supporting the magnification member a distance away from the object, the attachment part including a front part connected to the magnification member, a first arm connected to the front part adjacent one end of the front part, and a second arm connected to the front part adjacent another end of the front part, the first arm including a clamping portion for engaging the object, the second arm including a clamping portion for engaging the object, the first arm clamping portion opposing the second arm clamping portion; and wherein the front part is curved between the one end of the front part and the other end of the front part.

32. A magnifier for removable attachment to an object comprising:

a magnification member;

an attachment part for supporting the magnification member a distance away from the object, the attachment part including a front part connected to the magnification member, a first arm connected to the front part adjacent one end of the front part, and a second arm connected to the front part adjacent another end of the front part, the first arm including a clamping portion for engaging the object, the second arm including a clamping portion for engaging the object, the first arm clamping portion opposing the second arm clamping portion; and wherein the clamping portions are curved to engage a curved object.

33. A magnifier for removable attachment to an object to magnify the surface of the object, the magnifier comprising:

a curved magnification member having a curved upper surface and a curved under surface; and an attachment part connected to the curved magnification member to position said member spaced apart from the object.

34. The magnifier of claim 33 wherein the curved magnification member having a substantially uniform thickness between the upper and under surfaces.

* * * * *